United States Patent [19]

Dietz et al.

[11] Patent Number: 5,440,871
[45] Date of Patent: Aug. 15, 1995

[54] CIRCULATING FLUIDIZED BED REACTOR COMBINED CYCLE POWER GENERATION SYSTEM

[75] Inventors: David H. Dietz, Hampton, N.J.; Mouhyieldin Kandis, College Station, Tex.

[73] Assignee: Foster Wheeler Energy Corporation, Clinton, N.J.

[21] Appl. No.: 279,663

[22] Filed: Jul. 25, 1994

Related U.S. Application Data

[63] Continuation of Ser. No. 976,027, Nov. 13, 1992, abandoned.

[51] Int. Cl.⁶ .................... F02B 43/00; F02C 6/00
[52] U.S. Cl. .................... 60/39.02; 60/39.12; 60/39.182; 122/4 D
[58] Field of Search ............ 60/39.02, 39.12, 39.182, 60/39.511; 122/4 D

[56] References Cited

U.S. PATENT DOCUMENTS

| | | | |
|---|---|---|---|
| 4,066,738 | 1/1978 | Daman | 423/569 |
| 4,253,300 | 3/1981 | Willyoung | 60/39.182 |
| 4,387,560 | 6/1983 | Hamilton | 60/39.02 |
| 4,430,094 | 2/1984 | Gorzegno | 48/76 |
| 4,444,007 | 4/1984 | Mitchell et al. | 60/39.182 |
| 4,468,923 | 9/1984 | Jorzyk et al. | 60/39.02 |
| 4,630,436 | 12/1986 | Frutschi | 60/39.183 |
| 4,845,942 | 7/1989 | Schemenau et al. | 60/39.12 |
| 4,901,521 | 2/1990 | Schemenau et al. | 60/39.12 |
| 4,955,190 | 9/1990 | Robertson, Jr. | 60/39.02 |
| 5,212,941 | 5/1993 | Croonenbrock et al. | 60/39.02 |

FOREIGN PATENT DOCUMENTS

| | | |
|---|---|---|
| 0329155 | 8/1989 | European Pat. Off. |
| 0361065 | 4/1990 | European Pat. Off. |
| 3518512 | 11/1986 | Germany |

*Primary Examiner*—Rihcard A. Bertsch
*Assistant Examiner*—Howard R. Richman
*Attorney, Agent, or Firm*—Marvin A. Naigur

[57] ABSTRACT

A combined cycle power generation system and method in which a fluidized bed reactor is incorporated in a combined cycle system to recover heat from the hot exhaust gases from the gas turbine and to drive a series of steam turbines. Additional heat is provided by a combustor receiving fuel gas from a fuel gas generator and the hot gases thus generated are used to drive the gas turbine. The hot exhaust gases from the gas turbine are used as the primary fluidizing gas for the circulating fluidized bed reactor. The reactor is used to recover heat from the hot exhaust gases from the gas turbine and to generate steam to power a series of steam turbines. Additional heat is recovered, and pollutants are removed from flue gases by a condensing lower economizer.

14 Claims, 1 Drawing Sheet

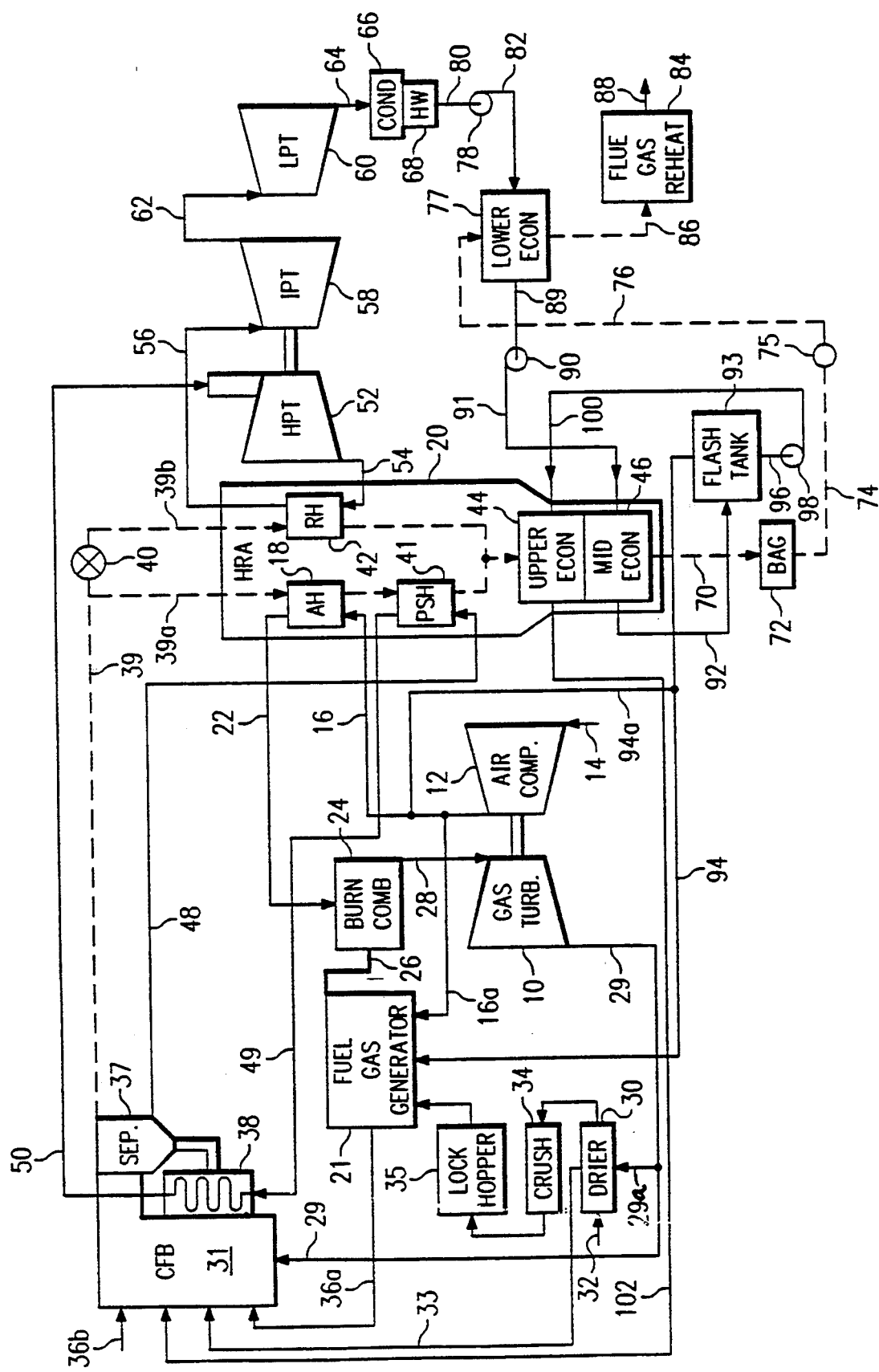

CIRCULATING FLUIDIZED BED REACTOR COMBINED CYCLE POWER GENERATION SYSTEM

This is a continuation of application Ser. No. 07/976,027 filed on Nov. 13, 1992, now abandoned.

BACKGROUND OF THE INVENTION

This invention relates to combined power generation systems, and, more particularly, to such a system in which a fluidized bed boiler is incorporated into a combined cycle system to receive exhaust gas from a gas turbine and to generate steam for the operation of steam turbines.

Combined cycle power generation systems are well known in the art and typically involve the combustion of natural gas or oil under pressure for the generation of hot gases which are passed through a gas turbine where the gases expand and cool while performing work in the generation of electrical power. The turbine exhaust gases are passed to a heat recovery area for the generation of high temperature steam which is used by steam turbines to perform additional work.

Combined cycle power generation systems typically have relatively high efficiency because the steam turbines operate at substantially lower temperatures than the gas turbine. Combined cycle systems, unfortunately, also require the use of premium fuels, such as natural gas or oil, for the operation of the gas turbine and are therefore considered too expensive for many industrial operations.

SUMMARY OF THE INVENTION

It is therefore an object of the present invention to provide a combined cycle system and method which integrates a circulating fluidized bed boiler for the generation of steam.

It is a further object of the present invention to provide a combined cycle system and method of the above type in which the exhaust gases from a gas turbine are passed to the fluidized bed boiler to fluidize and combust the particulate material contained in the boiler.

It is a further object of the present invention to provide a combined cycle system and method of the above type which integrates an air heater in the heat recovery area for the generation of hot gases to aid in driving the gas turbine.

It is further object of the present invention to provide a combined cycle system and method of the above type which incorporates a fuel gas generator for the production of fuel gas from relatively low cost fuels to drive the gas turbine.

It is further object of the present invention to provide a combined cycle system and method of the above type which enjoys increased thermal efficiency and lower pollution emissions through the extraction of thermal energy and subsequent condensation of gaseous pollutants.

It is further object of the present invention to provide a combined cycle system and method of the above type in which relatively low cost fuels can be used.

Toward the fulfillment of these and other objects, according to the system and method of the present invention a combined cycle system incorporates a circulating fluidized bed reactor for the generation of steam. An air heater disposed in the heat recovery area is used to supply a substantial portion of the heat required to drive a gas turbine. Additional heat is provided by a combustor which receives fuel gas from a fuel gas generator and generates hot gases used to drive the gas turbine. The hot exhaust gases from the gas turbine are used as the primary fluidizing gas for the circulating fluidized bed reactor. The reactor is used to recover heat from the hot exhaust gases from the gas turbine and to generate steam to power a series of steam turbines. Additional heat is recovered, and pollutants are removed from flue gases by a condensing lower economizer.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the drawing which is a block diagram of the system of the present invention.

DESCRIPTION OF THE PREFERRED EMBODIMENTS

In the schematic representation of the drawing, the flow of flue gases is shown by dashed lines and the flow of all other solids, liquids and gases including fuel, air, turbine exhaust, steam and water is shown by solid lines. A gas turbine is shown in general by the reference numeral 10 and is drivingly connected to an air compressor 12 and to an electrical generator (not shown) to drive same in a conventional manner. The air compressor 12 receives air from an inlet conduit 14 and a conduit 16 extends from the outlet of the air compressor 12 to the air inlet of an air heater 18 disposed in a heat recovery area 20. A branch conduit 16a extends from the conduit 16 to a fuel gas generator 21 for reasons to be described.

The air outlet of the air heater 18 is connected, by a conduit 22 to the air inlet of a combustor 24 which receives fuel gas from the gas generator 21, via a line 26, and operates in a conventional manner to combust the fuel gas and to produce hot exhaust gas. The gas outlet of the combustor 24 is connected, by a conduit 28, to the gas inlet of the gas turbine 10. The hot exhaust gases from the turbine 10 are passed, by a conduit 29, to the lower end portion of a circulating fluidized bed reactor 31 and, by a conduit 29a, to a solid fuel drier 30.

The drier 30 receives solid fuel, such as coal, from a line 32 in addition to the hot exhaust gas from the line 29 and operates in a conventional manner to dry the solid fuel. The gas outlet from the drier 30 is connected, by a conduit 33, to the secondary air inlets of the reactor 31. The dry solid fuel is conveyed from the drier 30 to the crusher 34 to be pulverized prior to storage in a lock hopper 35. The pulverized solid fuel is then conveyed, from the hopper 35, to the gas generator 21 which operates in a conventional manner to produce fuel gas. The fuel gas generator 21 can consist of a gasifier, pyrolyzer, carbonizer, or the like, and solid fuel particles entrained in the low-Btu gas are collected in a high efficiency cyclone separator and a ceramic cross flow filter (not shown). The carbonized solid fuel from the gas generator 21 is drained or conveyed, by a line 36a, to the reactor 31 for combustion.

The fluidized bed reactor 31 receives additional solid fuel, such as coal, from a line 36b and operates in a conventional manner to combust the fuel in a bed of particulate material which is fluidized by the hot exhaust gas from the conduit 29. The flue gases, along with entrained particles, from the fluidized bed reactor 31 are passed to a separator 37 which operates to separate the entrained solid material from the gases with the former being passed to a fluidized bed in a recycle heat exchanger 38 disposed adjacent the fluidized bed reactor 31 and the latter being passed, by a conduit 39, to the heat recovery area 20. The separated particles in the fluidized bed in the recycle heat exchanger 38 are passed to the fluidized bed in the fluidized bed reactor 31.

The conduit 39 is divided into two branch conduits 39a, 39b and a control valve 40 is disposed in the conduit 39b for purposes that will be described. The heat recovery area 20 includes the air heater 18, a presuperheater 41, a reheater 42, an upper economizer 44 and a mid economizer 46. The air heater 18 is connected in series with the presuperheater 41 and disposed in the path of the flue gases from the branch conduit 39a, and the reheater 42 is connected in parallel to the air heater and the superheater and disposed in the path of the flue gases from the branch conduit 39b. The upper economizer 44, and the mid economizer 46 are connected in series and receive flue gases from the presuperheater 41 and the reheater 42, as will be described in further detail.

The reactor 31 can be provided with heat exchange surface, such as fin-tube walls and water is passed through these surfaces to generate steam which is transferred, by a conduit 48, to the inlet of the presuperheater 41 which operates to transfer heat from the flue gases received from the separator 37 to the steam to heat the steam to a predetermined temperature. The steam outlet of the presuperheater 41 is connected, by a conduit 49, to the recycle heat exchanger 38. The recycle heat exchanger 38 operates to transfer heat from the separated solid material received from the separator 37 to the steam and to further heat the steam to a predetermined temperature. An example of a heat exchanger, connected to a reactor for the transfer of heat to water can be found in U.S. Pat. No. 4,896,717 assigned to the assignee of the present invention.

The steam outlet of the recycle heat exchanger 38 is connected, by a conduit 50, to the steam inlet of a high pressure turbine 52 which operates in a conventional manner, as will be described, to produce electrical power. The steam outlet of the high pressure steam turbine 52 is connected, by a conduit 54, to the reheater 42, which operates to transfer heat from the flue gases received from the separator 37 to heat the steam to a predetermined temperature prior to the steam being introduced, by a conduit 56, to the steam inlet of an intermediate pressure turbine 58. The high pressure turbine 52 and the intermediate pressure turbine 58 are drivingly connected in a conventional manner to an electrical generator (not shown) to produce electrical energy. A low pressure turbine 60 is connected, by a conduit 62, to the steam outlet of the intermediate pressure turbine 58 and is drivingly connected in a conventional manner to an electrical generator (not shown) to produce additional electrical power. There are several connections that are common to steam turbines including the high pressure steam turbine 52, the intermediate steam turbine 58, and the low pressure turbine 60, which are not shown in the drawing for the convenience of presentation since they are conventional.

The steam outlet of the low pressure turbine 60 is connected, by a conduit 64, to a condenser 66 which operates to cool and to condense the steam into water in a conventional manner. A hot well 68 is provided to collect the water thus generated, which is mixed along with any make-up water and condensed steam-bleed collected from the steam turbines 52, 58, and 60.

The gas outlet of the mid economizer 46 is connected, by a conduit 70, to the gas inlet of a baghouse 72 which is provided for the removal of a substantial portion of the remaining particulate material entrained in the flue gases. The gas outlet of the baghouse 72 is connected, by a conduit 74, to the gas inlet of an induced draft fan 75. The gas outlet of the induced draft fan 75 is connected, by a conduit 76, to the gas inlet of a condensing lower economizer 77. A water pump 78 receives water from the hot well 68, via a conduit 80, and passes the water to the condensing lower economizer 77, via a conduit 82, to transfer heat from the flue gases passing through the lower economizer 77 to the water. The lower economizer 77 is specially designed with all gas side surfaces coated with teflon to prevent corrosion which results from SOx and NOx condensation and provide for the extraction of both sensible and latent heat.

A flue gas reheater 84 receives the flue gases from the lower economizer 77, via a conduit 86, to transfer heat to the flue gases from a source (not shown), such as condensed steam bleed, hot flue gases, and the like. It is understood that a stack (not shown) is provided to receive the relatively cool gases from the flue gas reheater 84, via a conduit 88, for discharging the flue gases into the atmosphere.

The water outlet of the lower economizer 77 is connected, by a conduit 89, to the water inlet of a water pump 90. The outlet of the water pump 90 is connected, by a conduit 91, to the inlet of the mid economizer 46, and the water outlet of the mid economizer is connected, by a conduit 92, to the inlet of a flash tank 93. The flash tank 93 operates to degas the water and to convert a portion of the water to steam which is transferred, by a conduit 94, to the fuel gas generator 21 for use in generating fuel gas, and, via a branch conduit 94a, to the conduit 16 for passage through the air heater 18 and the combustor 24 to the gas turbine 10 to aid in driving same. It is understood that the pressure drop across the air heater 18 equals the pressure drop across the fuel gas generator 17.

The remaining portion of the water in the flash tank 93 is transferred, by a conduit 96, to the inlet of a pump 98 having an outlet connected to the upper economizer 44, by a conduit 100. Thus, the upper economizer 44, the mid economizer 46, and the lower economizer 77 operate to transfer heat from the flue gases received from the presuperheater 41 and the reheater 42 to the water passing therethrough. The water is transferred, by the conduit 102, from the upper economizer 44 to the reactor 31, as will be described.

In operation, the air compressor 12 receives air at a predetermined temperature and pressure, such as ambient conditions, and is driven by the gas turbine 10 to compress the air in order to raise its temperature and pressure a predetermined amount, such as to 710° F. and 205 psia, respectively. Steam from the flash tank 93 is mixed with the compressed air in the conduit 16 to form a gas mixture which is passed through the air heater 18 in a heat exchange relation go the hot flue gases supplied to the air heater 18 by the separator 37 to raise the temperature of the mixture a predetermined amount. The gas mixture from the air heater 18 is introduced to the combustor 24 which also receives fuel from the fuel gas generator 21 and combuses the fuel in the presence of the gas mixture in order to raise the temperature of the air an additional predetermined amount, such as to 2300° F. The air, along with the gaseous products of combustion, is then introduced to the gas turbine 10 to drive same with an increased mass and volume to enable the turbine 10 to drive the air compressor 12 and the electrical generator (not shown). The exhaust gases from the turbine 10 are passed to the lower portion of the reactor 31 to fluidize and combust the particulate material contained therein.

The fuel gas generator 21 receives particulate solid fuel, such as coal, from the lock hopper 35 and pyrolyzes, or carbonizes the particulate fuel to produce low-Btu fuel gas that is passed to, and burned in the combustor 24. The carbonized solid fuel from the gas generator 21 is transferred to the reactor 31 for combustion. Steam is supplied from the flash tank 93 to the fuel gas generator 21 for cleaning the generator as required due to the combustable nature of the contents.

The reactor 31 operates in a manner disclosed in the above-identified patent to receive particulate fuel material and particulate sorbent material, such as coal and limestone, respectively, and to combust the particulate material in the presence of the fuel from the gas generator 21 and the exhaust gases from the turbine 10 to raise the temperature of the water passing through its heat exchange surfaces to a predetermined temperature, such as to 1050° F. The flue gases, along with entrained particles from the fluidized bed reactor 31, are passed to the separator 37 which operates to separate the entrained solid material from the gases with the solid material being introduced to the recycle heat exchanger 38 to heat the steam received from the presuperheater 41, as described above. The hot gases from the separator 37 are passed to the air heater 18 to raise the temperature of gas mixture, and to the reheater 42 and the presuperheater 41 to raise the temperature of the steam. The control valve 40 is disposed in the branch duct 39b to regulate the flow of the hot flue gases across the reheater 42, and consequently, regulate the temperature of the steam passing therethrough. The hot gases are then passed through the economizers 44 and 46, and through the baghouse 72 to the lower economizer 77 for reasons to be described.

The reactor 31 also receives water from the upper economizer 44 to convert the water to steam at a predetermined pressure, such as 2500 psia. The steam thus produced is passed to the presuperheater 41 and is passed in a heat exchange relation to the above-mentioned hot flue gases to raise the temperature of the steam a predetermined amount. The steam then passes from the presuperheater 41 to the the recycle heat exchanger 38 and is passed in a heat exchange relation to the separated particles in the recycle heat exchanger to raise the temperature of the steam an additional predetermined amount, such as to 1050° F. The steam then passes from the heat exchanger 38 to the high pressure turbine 52 which operates in a conventional manner to produce electrical power. The exhaust steam leaves the turbine 52 at a predetermined temperature and pressure, such as 695° F. and 610 psia, respectively, and is passed to the reheater 42 to again raise the temperature of the steam to a predetermined temperature, such as to 1050° F. prior to being passed to the intermediate pressure turbine 58 to produce additional electrical power. The low pressure turbine 60 receives steam from the intermediate pressure turbine 58 to produce still further electrical power.

The condenser 66 receives the steam from the low pressure turbine 60 and condenses the steam into water at a predetermined temperature and pressure, such as 92° F. and 1.5 inches of mercury, respectively. It is understood that a cooling tower (not shown) may be provided to absorb the heat released from the steam during condensation. The water then passes to the hotwell 68 which operates as a reservoir to receive and mix water from multiple sources, such as steam bleed from the steam turbines, make-up water and the like.

The water is pumped from the hotwell 68 by the pump 78 at a sufficient pressure to meet the relative pressure drop as measured across the the lower economizer 46. The water thus passes through the lower economizer 77 which operates to extract residual thermal energy from the flue gases supplied to the lower economizer from the induced draft fan 75. The temperature of the flue gases is reduced a predetermined amount, such as from 350° F. to approximately 130° F. at the lower economizer 77 while the temperature of the water is increased a predetermined amount, such as from 96° F., to 206° F.

The water is pumped from the lower economizer 77 through the mid economizer 46 and the flash tank 93 by the pump 90 at a sufficient pressure to meet the relative pressure drop as measured across the mid economizer 46 and the flash tank 93. The water is then pumped from the flash tank 93 through the upper economizer 44, the reactor 31 and the recycle heat exchanger 38 by the pump 98 at a sufficient pressure, such as 2500 psig, to meet the relative pressure drop as measured across the upper economizer 44 and the recycle heat exchanger 38, and as required for the operation of the high pressure turbine 52. Thus, the water is passed from the lower economizer 77 through the mid economizer 46, the flash tank 93 and the upper economizer 44 in tandum, and heat is transferred from the flue gases passing through each economizer to raise the temperature of the water a predetermined amount, such as to approximately 600° F. prior to being introduced to the reactor 31. A portion of the heat transferred from the flue gases to the water is released by the flash tank 93 in the form of steam and supplied to the air heater 18 and subsequently to the gas turbine 10 to produce electrical power.

As a result of the above heat exchange with the water passing through the economizers 44 and 46 the temperature of the flue gases passing through the economizers are lowered a predetermined amount, such as from 800° F., to approximately 350° F. prior to the gases being introduced to the baghouse 72. The baghouse 72 removes the entrained particulate material from the flue gas prior to the gases being introduced to the lower economizer 77. The lower economizer 77 operates to transfer both sensible and latent heat from the flue gases to the water passing therethrough and resulting in the condensation, and therefor the extraction, of nitric, sulfuric and sulfurous acids from the flue gases.

The flue gas reheater 84 receives the flue gases from the lower economizer 77 and transfers heat from a source (not shown), such as hot flue gases, condensed steam bleed, and the like, to raise the temperature of the flue gases from the lower economizer a predetermined amount, such as to 160° F. prior to the release of the flue gases through the stack (not shown).

The system and method of the present invention has several advantages over the prior art. For example, the use of the air heater 18 provides a substantial portion of the energy required for the operation of the turbine 10 reducing the demand for expensive fuels, such as oil and natural gas. In addition, the incorporation of the fuel gas generator 21 provides for the production of fuel gas from relatively low cost fuels, such as coal, to drive the gas turbine. Further, the exhaust gases from the turbine 10 are supplied to the circulating fluidized bed reactor 31 for the fluidization of the particulate material contained therein and resulting in the recovery of the thermal energy stored in the exhaust gases. Moreover, the circulating fluidized bed reactor 31 can utilize relatively inexpensive high sulfur coal for combustion and supplies a substantial portion of the energy required for the operation of both the gas turbine 10 and the steam turbines 52, 58 and 60 for the production of electrical power. Also, the condensing lower economizer 77 provides additional heat recovery through the extraction of both latent and sensible heat which results in the condensation, and therefore removal, of additional pollutants, such as, NOX, SOx and entrained particulates. Consequently, the condensing lower economizer 77 provides increased thermal efficiency while reducing pollution emissions.

Although not specifically illustrated in the drawing, it is understood that additional necessary equipment will be provided, and that these and all components described above are arranged in an appropriate fashion to form a complete and operative system.

It is understood that variations may be made in the method of the present invention without departing from the scope of the invention. For example, more or less economizers and/or steam turbines may be provided and a deaerator could be substituted for the flash tank. In addition, the gas turbine 10 can be used to supply not only primary air to the reactor 31, but also secondary air. Similarly, steam can be supplied, not only to the air heater 18 and the fuel gas generator 17, but also to the combuster 24.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluidized bed combustion system comprising:
   a vessel operative at atmospheric pressure;
   means for forming a bed of particulate material including fuel in said vessel whereby a portion of said particulate material is entrained by flue gases produced as a result of combustion of said fuel;
   means for fluidizing said particulate material;
   means for separating entrained particulate material from flue gases produced as a result of combustion of said fuel;
   means for injecting air with a first quantity of steam to preheat said air;
   means for passing a first portion of said separated flue gases into a heat exchange relation with a second quantity of steam to heat said second quantity of steam;
   means for passing a remaining portion of said separated flue gases into a heat exchange relation to said preheated air to heat said preheated air;
   valve means for controlling the relative amounts of separated flue gases passed in said heat exchange relationship with said second quantity of steam and said preheated air;
   means for passing water in a heat exchange relation to said fluidized bed to convert said water to a third quantity of steam;
   steam turbine means;
   means for passing said second quantity of steam to said steam turbine means to drive same;
   means for passing said third quantity of steam to said steam turbine means to drive same;
   a gas combustor;
   means for passing said heated air to said gas combustor;
   means for passing fuel gas to said gas combustor for combusting said fuel gas in the presence of said first quantity of steam and said heated air to produce hot gases;
   a gas turbine; and
   means for passing said hot gases to said gas turbine to drive same.

2. The system of claim 1 further comprising means for condensing exhaust steam from said steam turbine means to form said water.

3. The system of claim 1 further comprising means for recycling said separated particulate material back to said fluidized bed.

4. The system of claim 1 further comprising means for receiving organic material, and means for gasifying said material to produce said fuel gas.

5. A fluidized bed combustion method comprising the steps of:
   forming a bed of particulate material including fuel at atmospheric pressure;
   fluidizing said particulate material whereby a portion of said particulate material is entrained by flue gases produced as a result of combustion of said fuel;
   separating the entrained particulate material from flue gases produced as a result of combustion of said fuel;
   injecting air with a first quantity of steam to preheat said air and increase the heat capacity of said air;
   passing a first portion of said separated flue gases in a heat exchange relation with a second quantity of steam to heat said second quantity of steam;
   passing a remaining portion of said flue gases in a heat exchange relation with said preheated air to heat said preheated air;
   controlling the relative amounts of separated flue gases passed in said heat exchange relationship with said second quantity of steam and said preheated air;
   passing water in a heat exchange relation to said fluidized bed to convert said water to a third quantity of steam;
   passing said second quantity of steam to a steam turbine to drive same;
   passing said third quantity of steam to said steam turbine to drive same;
   passing said heated air to a gas combustor;
   passing fuel gas to said gas combustor;
   combusting said fuel gas in said gas combustor in the presence of said first quantity of steam and said heated air to produce hot gases; and
   passing said hot gases to a gas turbine to drive same.

6. The method of claim 5 further comprising the step of condensing exhaust steam from said steam turbine to form said water.

7. The method of claim 5 further comprising the step of recycling said separated particulate material back to said fluidized bed.

8. The method of claim 5 further comprising the steps of receiving organic material, and gasifying said organic material to produce said fuel gas.

9. An atmospheric fluidized bed combustion system comprising:
   means for receiving organic material;
   a compressor for receiving ambient air and outputting compressed air;
   means for gasifying said organic material in the presence of a first quantity of steam and said compressed air to produce fuel gas and solid particulate fuel;
   a gas combustor;
   means for passing said compressed air to said gas combustor;
   means for passing said fuel gas to said gas combustor for combustion therein in the presence of said compressed air to produce hot gases;
   a gas turbine;
   means for passing said hot gases to said turbine to drive same, said turbine driving said compressor and outputting exhaust gases;
   a vessel operative at atmospheric pressure;
   means for forming a bed of particulate material, including said solid particulate fuel, in said vessel;
   means for passing said exhaust gases to said vessel;
   means for fluidizing said particulate material whereby a portion of said particulate material is entrained by flue gases produced as a result of combustion of said exhaust gases and said solid particulate fuel;
   means for separating said entrained particulate material from said flue gases;
   means for passing a first portion of said separated flue gases into a heat exchange relation with a second quantity of steam to heat said second quantity of steam;
   means for passing a remaining portion of said separated flue gases into a heat exchange relation with said compressed air to heat said compressed air, said heated compressed air forming said compressed air passed to said gas combustor;
   valve means for controlling the relative amounts of separated flue gases passed in said heat exchange relationship with said second quantity of steam and said preheated air;
   means for passing water to said fluidized bed to convert said water into a third quantity of steam;
   a steam turbine;
   means for passing said second quantity of steam to said steam turbine to drive same; and
   means for passing said third quantity of steam to said steam turbine to drive same.

10. The system of claim 9, further comprising means for injecting steam into said compressed air passed in said heat exchange relation with said flue gases.

11. The system of claim 10 further comprising a flash tank for supplying said steam injected into said compressed air.

12. An atmospheric fluidized bed combustion method comprising:
   receiving organic material;
   compressing air;
   gasifying said organic material in the presence of a first quantity of steam and said compressed air to produce fuel gas and solid particulate fuel;
   passing said compressed air to a gas combustor;
   passing said fuel gas to said gas combustor for combustion therein in the presence of said compressed air to produce hot gases;
   passing said hot gases to a gas turbine to drive same, said turbine driving said compressor and outputting exhaust gases;
   forming a bed of particulate material, including said solid particulate fuel, in a vessel operative at atmospheric pressure;
   passing said exhaust gases to said vessel;
   fluidizing said particulate material whereby a portion of said particulate material is entrained by flue gases produced as a result of combustion of said exhaust gases and said solid particulate fuel;
   separating said entrained particulate material from said flue gases;
   passing a first portion of said separated flue gases into a heat exchange relation with a second quantity of steam to heat said second quantity of steam;
   passing a remaining portion of said separated flue gases into a heat exchange relation with said compressed air to heat said compressed air, said compressed air forming said compressed air passed to said gas combustor;
   controlling the relative amounts of separated flue gases passed in said heat exchange relationship with said second quantity of steam and said air;
   passing water to said fluidized bed to convert said water into a third quantity of steam;
   passing said second quantity of steam to a steam turbine to drive same; and
   passing said third quantity of steam to said steam turbine to drive same.

13. The system of claim 12, further comprising injecting steam into said compressed air passed in said heat exchange relation with said flue gases.

14. The system of claim 13 further comprising supplying, from a flash tank, said steam injected into said compressed air.

* * * * *